H. WADSWORTH.
Cut-Off.

No. 203,224. Patented April 30, 1878.

Witnesses.

Inventor.
Herbert Wadsworth.
F. Curtis. Atty.

N. PETERS, PHOTO-LITHOGRAPHER, WASHINGTON, D. C.

H. WADSWORTH.
Cut-Off.

No. 203,224. Patented April 30, 1878.

On line 1-2 of Fig. 2.

On line 3-4 of Fig. 2.

Witnesses. Inventor.
Herbert Wadsworth.
F. Curtis. Atty.

3 Sheets—Sheet 3.
H. WADSWORTH.
Cut-Off.
No. 203,224. Patented April 30, 1878.
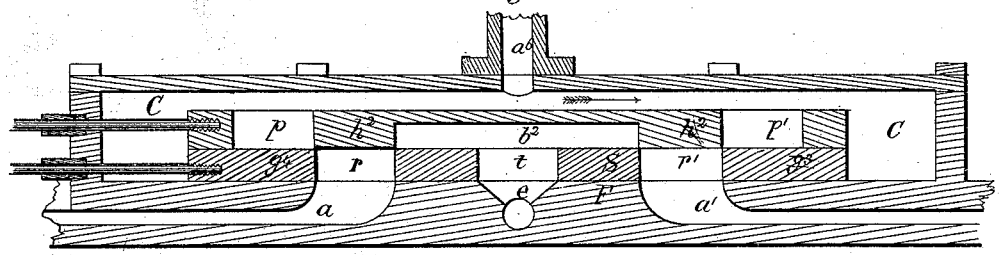
Fig. 10.
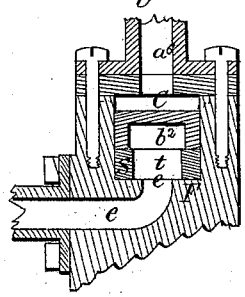
Fig. 11.
Diagram 1.
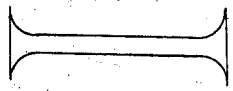
Diagram 2.
Fig. 18.
Fig. 19.
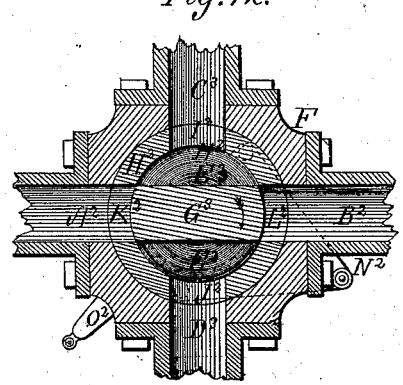
Fig. 12.
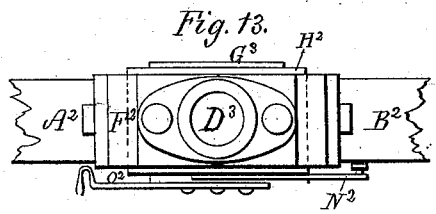
Fig. 13.
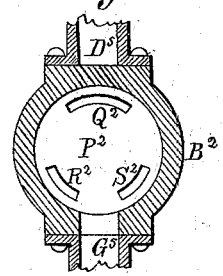
Fig. 14.
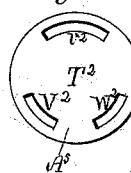
Fig. 16.
Fig. 15.
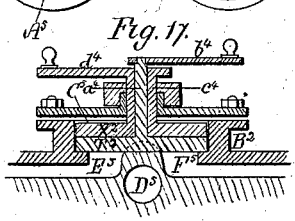
Fig. 17.
Witnesses.
Wm. Turell Andrews Jr.
Louis A. Curtis.
Inventor.
Herbert Wadsworth.
F. Curtis, Atty.

UNITED STATES PATENT OFFICE.

HERBERT WADSWORTH, OF GENESEO, NEW YORK.

IMPROVEMENT IN CUT-OFFS.

Specification forming part of Letters Patent No. 203,224, dated April 30, 1878; application filed March 16, 1878.

*To all whom it may concern:*

Be it known that I, HERBERT WADSWORTH, of Geneseo, Livingston county, New York, have invented certain new and useful Improvements in Apparatus for Governing the Movement of Rudders and other Objects, of which the following is a specification:

In my invention I have had a steering apparatus particularly in view; but the invention is applicable not only for that purpose, but generally for the purpose of governing the movement of any object, or of governing the power by which such object is moved.

It is my object to control the extent to which any engine shall function, and to so prevent its further action that should any outside energy influence its rendering—that is to say, the amount of its work or extent of its movement—that energy will be counteracted in exact proportion to its influence on the rendering of the engine. This I effect by connecting the cut-off which controls the supply of steam or other motor fluid with the object whose movement is to be controlled—as, for instance, to the rendering-shaft of an engine—in such a manner that the cut-off shall derive its movement from the object; and I so arrange the intermediate mechanism connecting the two that the cut-off shall make its full journey over the port-plate to cut off the supply of motor fluid, while the engine functions to the full extent desired, so that by the time the limit has been reached by the engine the cut-off will have attained the point at which it cuts off further supply of motor fluid. If by any outside energy or influence the engine is caused to function beyond this limit, the cut-off, moving also proportionately, will admit a supply of the motor fluid in a reverse direction, so as to bring back the engine to the predetermined point.

My invention is applicable to a great variety of objects—traction and road engines, steam-hammers, locomotives, and the like. It is, however, as above said, especially adapted to control the engines of steam-tillers, and it is this application which I have represented in the accompanying drawings in illustration of my invention.

In the drawing, Figure 2 is a longitudinal vertical central section of a valve-box, valve, and cut-off in a central neutral position. These parts, in order to illustrate one simple application of my invention, are mounted on a cylinder, whose piston H, through its piston-rod I, is connected with and operates the tiller of a rudder, as indicated in Fig. 1, hereinafter referred to. The extreme functioning of which this engine is capable is the full stroke of its piston.

Fig. 3 is a top view of the port-plate. Fig. 4 is a bottom view of the same. The exhaust-port $d$ leads through $b$ and $e$, Fig. 4. $c$ is the port that leads to the left end of cylinder A through passage $a$, and provides for the admission of the motor fluid to that end of the cylinder. The other admission-port to the opposite end of the cylinder is shown at $c^1 a^1$. S, Fig. 7, is a plan of the cut-off, provided with three ports corresponding to those of the port-plate. $e^2$ corresponds to $c$, $f$ to $d$, and $e^3$ to $c^1$.

Fig. 5 is a top view, and Fig. 6 a bottom view, of the steam-valve E. This valve, the cut-off, and the port-plate are shown in their relative positions in Fig. 2. The ports $g\ g'$ of the valve E allow the steam to reach the surface of the cut-off. $h\ i\ j$ is the exhaust cavity or recess. When the valve E, by suitable means—as, for instance, by its rod $m$—is moved to the right in the direction of the arrow, steam will pass to the left end of the cylinder through $g$, $e^2$, $c$, and $a$, and will move the piston H to the right, as indicated by the arrow. At the same time the steam from the right of the cylinder will exhaust through $a^1\ c^1\ e^3\ i\ h\ f\ d\ b\ e$. A movement of the valve in the opposite direction will produce a contrary action, as will be understood without further explanation.

Steam may enter the valve E through its top; but it is preferable to balance this valve as far as possible by making its top work against the under side of the top of valve-box, as shown, in which case the ports $g\ g'$ may open from the side, as shown in Fig. 18. In case the valve fills the box, as shown in Figs. 8 and 9, provision can be made for steam-admission by groove C cut in the side of the valve, through which the motor fluid is allowed free circulation to both ends of the valve-box. The ports $g\ g'$ may open either at the sides of the valve or at its ends, as shown in Figs. 9 and 19.

In Fig. 1 I have represented a simple application of the arrangement before described to a steam-tiller. P is the rudder-head; O, the tiller, whose circular movements about P are converted into rectilinear movement in the line of the cylinder by means of the crank-pin N, held in the block M, which travels to and fro over the piston-rod cross-head K through the slide-opening L, K being enabled to resist any twisting influence by means of the grooved slides J. For convenience' sake, the rack $f^4$ is attached to the cross-head K, so as to move back and forth with it. The journey of the cut-off being proportional to the rendering of the engine, or, what is the same thing in this case, the movement of the cross-head K, it is only necessary to find the maximum movement allowed the said cut-off by the construction, and to then connect it with the cross-head K by some mechanism that will proportionately reduce the movement of K. This, in the present instance, is effected by mounting on a common axis, $y$, two toothed wheels, $x$ and $h^4$, the latter gearing with the rack $f^4$ and the former with a rack, $w$, on the rod $v$ of the cut-off. The two wheels are so proportioned that the radius of $x$ is to the radius of $h^4$ as the desired movement of the cut-off is to the total movement of the cross-head. Under this arrangement, therefore, the movement of the steam-valve in either direction will, by admitting the motor fluid to the cylinder, work a movement of the tiller; but this movement of the tiller operates the cut-off, which moves after the steam-valve, and reaches the point where it shuts off steam-supply just at the time when the tiller has moved the desired distance. Thus the tiller responds to the movement of the steam-valve, but in so responding brings at once into operation the cut-off, which checks its further movement at the desired point.

My invention is susceptible of a variety of modifications, some of which I have represented in the drawings.

Fig. 10 represents the section of a valve-box, valve, and cut-off. The motor is admitted by the feed-pipe $a^6$ to valve-box C, but, as the parts are in a neutral position, can find no passage to $a$ or $a^1$; nor is there any passage from these to the exhaust $e$. If, now, the valve be moved to the right, the motor, passing through $p$ and $r$, would enter $a$, and cause the engine to work in one direction until the cut-off S, moved by the rendering-shaft, had resumed its neutral position with respect to the valve, the engine meantime exhausting through $r'$ $b^2$ $t$ into $e$. Should the engine not stop on account of expansion of fluid in tubes, or from other cause, the cut-off would pass beyond the neutral and assume a negative position with regard to the valve, and a passage being opened through $r$ $b^2$ $t$ and $p'$ $r'$ $a^1$, the engine would stop.

It must be noted that the tubes $a$ and $a^1$ should in sectional area equal that of the feed-pipe, while the ports $a$ and $a^1$ should be as long as possible, and be cut in the shape shown in Diagram 1 or 2, accordingly as it is desired that the engine start and stop suddenly or gradually.

Fig. 11 is a cross-section through this valve at its middle, neutral, and central position. Fig. 12 is a vertical central section of a four-way cock designed to function similarly to above valve. Fig. 13 is an under-side view of the same. $D^3$ is the discharging-pipe; $A^2$ and $B^2$, the channels for motor to cause opposite functionings in engine. $C^3$, Fig. 12, is the feed-pipe; $G^3$, the partition of the cock, which is moved by the arm $O^2$. $H^2$ is the cut-off moved by arm $N^2$, connected with the rendering-shaft of the engine. Let $G^3$ be moved as is indicated by arrow, or in the opposite direction; then the motor fluid will, coming from $C^3$ through $I^2$ and $E^3$, pass to $A^2$ or $B^2$ through $K^2$ or $L^2$, as the case may be, exhausting out to $D^3$ through $E^2$ and $J^2$ by $L^2$ or $K^2$, according as $G^3$ was moved.

Fig. 17 is a transverse vertical section through a circular valve-box, valve, and cut-off. Fig. 14 is a horizontal section, showing the port-plate $P^2$, the valve-box $B^2$, the feed $G^5$, the exhaust-pipe $D^5$, exhaust-port $Q^2$, and ports $R^2$ and $S^2$, which lead the motor to function in opposite ways by $E^5$ and $F^5$, Fig. 17.

Fig. 16 is a bottom view of the cut-off, with openings similar to those in the port-plate, $U^2$ corresponding to exhaust $Q^2$, $V^2$ to $S^2$, and $W^2$ to $R^2$. The cut-off $T^2$ has a shaft, $a^4$, passing through shaft $c^4$ of valve $X^2$, by which it is moved by the arm $b^4$, while the valve $X^2$, by its neck $c^4$, is moved by $d^4$.

Figure 1:
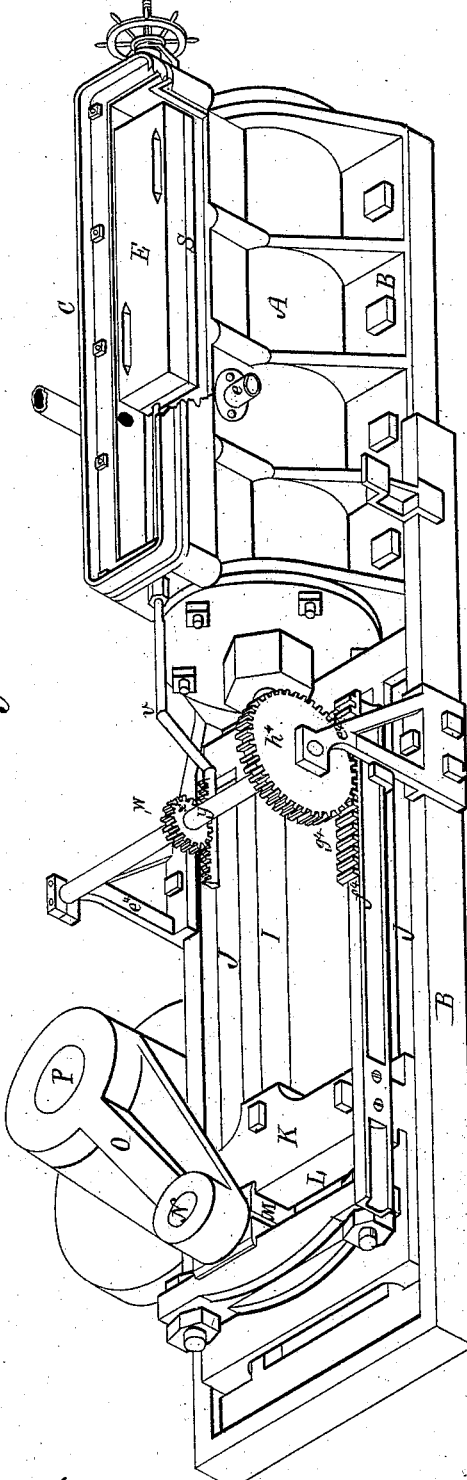
Figure 2:
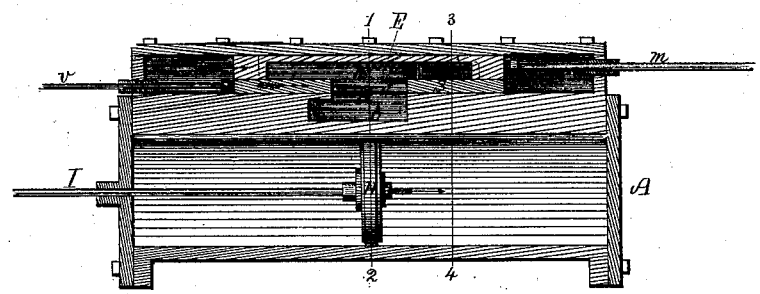
Figure 3:
Figure 4:
Figure 5:
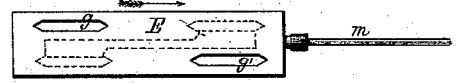
Figure 6:
Figure 7:
Figure 8:
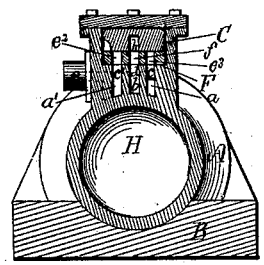
Figure 9:
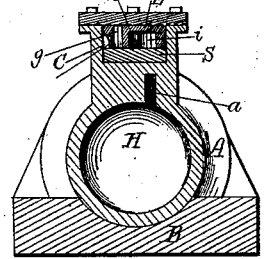

Fig. 15 is a bottom view of the valve $X^2$. $Y^2$ is a groove, which reaches from the farther ends of the cut-off ports $V^2$ and $W^2$, and covers the exhaust-port $U^2$. $Z^2$ covers the space on the cut-off between $V^2$ and $W^2$, and is cut through the valve, so that the circulating fluid may enter $R^2$ or $S^2$ through $V^2$ or $W^2$, or neither, as the valve and cut-off stand positive, negative, or neutral. If the valve be moved from the central neutral position, the fluid will enter $E^5$ or $F^5$ by $V^2$, or $W^2$ from $Z^2$, and exhaust to $D^5$ through $Q^2$ or $Y^2$ from $W^2$ or $V^2$.

This valve was designed by me to control the workings of a steam-tiller whose swing was ninety-six degrees—that is, forty-eight degrees each way. It was intended to be placed just behind the rudder-head and regulate the supply of steam to two cylinders, with cylindrical valves acting on a horizontal screw-shaft which engaged in a worm-wheel set on the rudder-head.

In all the arrangements above described, whether an admission valve or cock be used, it will be noted that the cut-off is provided with ports corresponding to those of the port-plate; that it follows the movement of the admission valve or cock; and that its movement is proportioned to that of the rendering-shaft or object whose movement is to be controlled in such manner that its journey to cut off the motor fluid, or to close the passage opened by the admission valve or cock for the entrance of the motor fluid, shall occupy just the time required for the amount of work or extent of movement required of the said rendering-shaft, using the term "rendering-shaft" to distinguish thereby the object whose movement is to be controlled. It is these features which may be said to characterize my invention.

Having described my improvements, and the manner in which the same are or may be carried into effect, I shall state my claims as follows:

1. The combination, substantially as set forth, with an admission valve or cock, of a cut-off arranged to follow the movement of said admission valve or cock at a speed so proportioned to the movement of the rendering-shaft or other object whose motion is to be controlled that its journey to close the passage opened by the admission valve or cock shall be completed at the time when the rendering-shaft completes the work or travels the distance required of it.

2. The combination, substantially as set forth, with the rendering-shaft or other object whose movement is to be controlled, of a valve or cock through which passes the motor fluid that drives the mechanism by which said object is moved, and a cut-off connected with and operated by said object to arrest the movement of the driving mechanism at any desired point.

3. The cut-off arranged and operating, in connection with the admission and exhaust ports, substantially in the manner set forth, so that the engine, in case it should work or travel beyond the predetermined point, will be caused to reverse its action until brought back to that point.

HERBERT WADSWORTH.

Witnesses:
F. CURTIS,
LOUIS A. CURTIS.